United States Patent [19]

Chu et al.

[11] Patent Number: 5,174,976
[45] Date of Patent: Dec. 29, 1992

[54] METHOD FOR CALCINING CRYSTALLINE (METALLO)ALUMINOPHOSPHATE COMPOSITIONS

[75] Inventors: Cynthia T. Chu; Jeffrey S. Beck, both of Princeton, N.J.

[73] Assignee: Mobil Oil Corporation, Fairfax, Va.

[21] Appl. No.: 636,054

[22] Filed: Dec. 31, 1990

[51] Int. Cl.⁵ .................................. C01B 33/34
[52] U.S. Cl. .................. 423/328.2; 502/208; 502/214
[58] Field of Search ........... 423/305, 306, 328, 329; 502/208, 214

[56] References Cited

U.S. PATENT DOCUMENTS

| | | | |
|---|---|---|---|
| 4,310,440 | 1/1982 | Wilson et al. | 252/435 |
| 4,440,871 | 4/1984 | Lok et al. | 502/214 |
| 4,619,818 | 10/1986 | Derouane et al. | 423/306 |
| 4,623,527 | 11/1986 | Derouane et al. | 423/306 |
| 4,632,811 | 12/1988 | Derouane et al. | 423/306 |
| 4,639,357 | 1/1987 | Derouane et al. | 423/306 |
| 4,639,358 | 1/1987 | Derouane et al. | 423/306 |
| 4,664,897 | 5/1987 | Derouane et al. | 423/306 |
| 4,673,559 | 6/1987 | Derouane et al. | 423/306 |
| 4,880,611 | 11/1989 | von Ballmoos et al. | 423/306 |

Primary Examiner—R. Bruce Breneman
Attorney, Agent, or Firm—Alexander J. McKillop; Charles J. Speciale; Laurence P. Hobbes

[57] ABSTRACT

This invention relates to a method for calcining without structural alteration crystalline [metallo]aluminophosphate compositions, e.g, those comprising pores which are formed by 18-membered rings. The method comprises contacting the dried composition with an inert gas at high flow rates while heating said composition to calcining temperature at a heating rate no greater than 10° C./minute. Thereafter the composition is contacted at calcining temperature with an oxygen-containing gas at high flow rates.

16 Claims, 5 Drawing Sheets

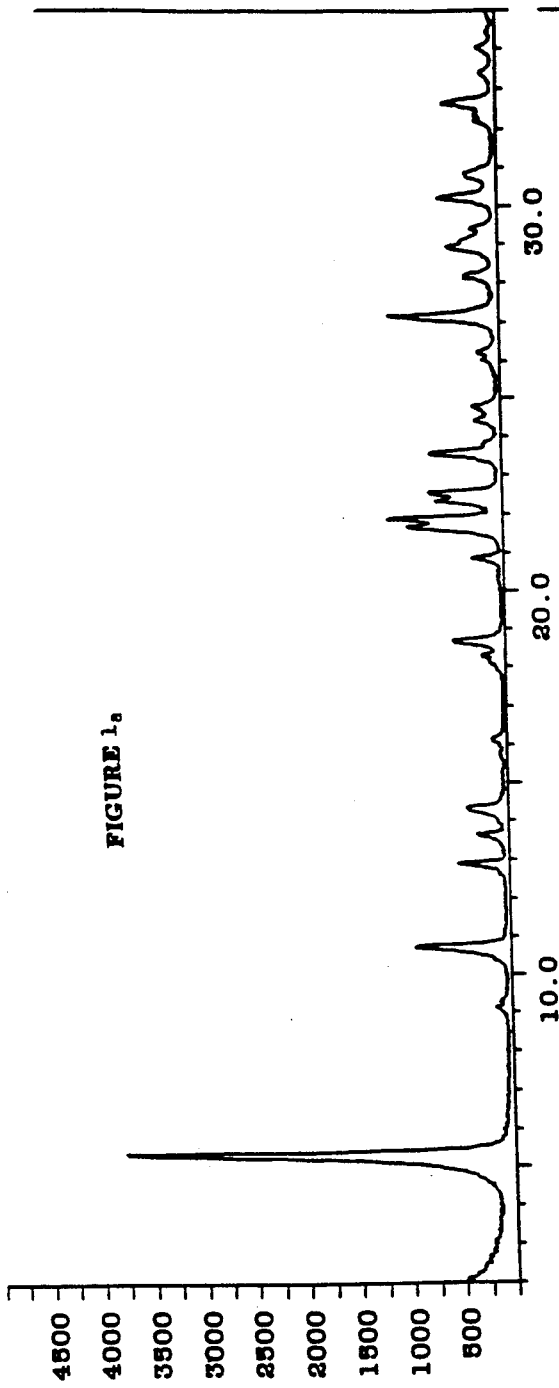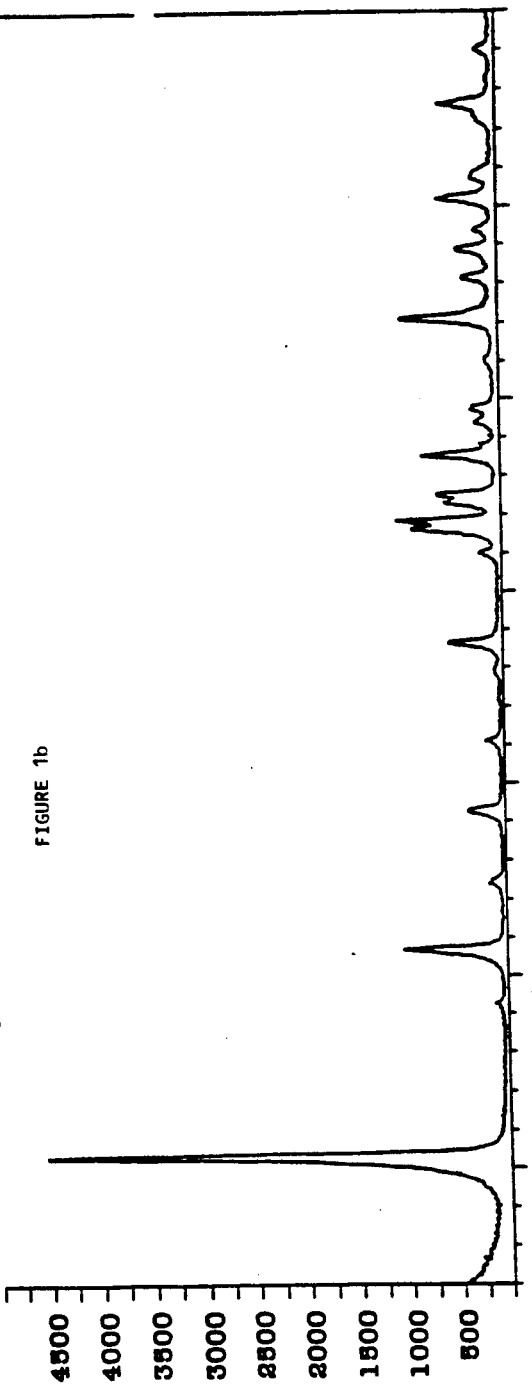
FIGURE 1a
FIGURE 1b

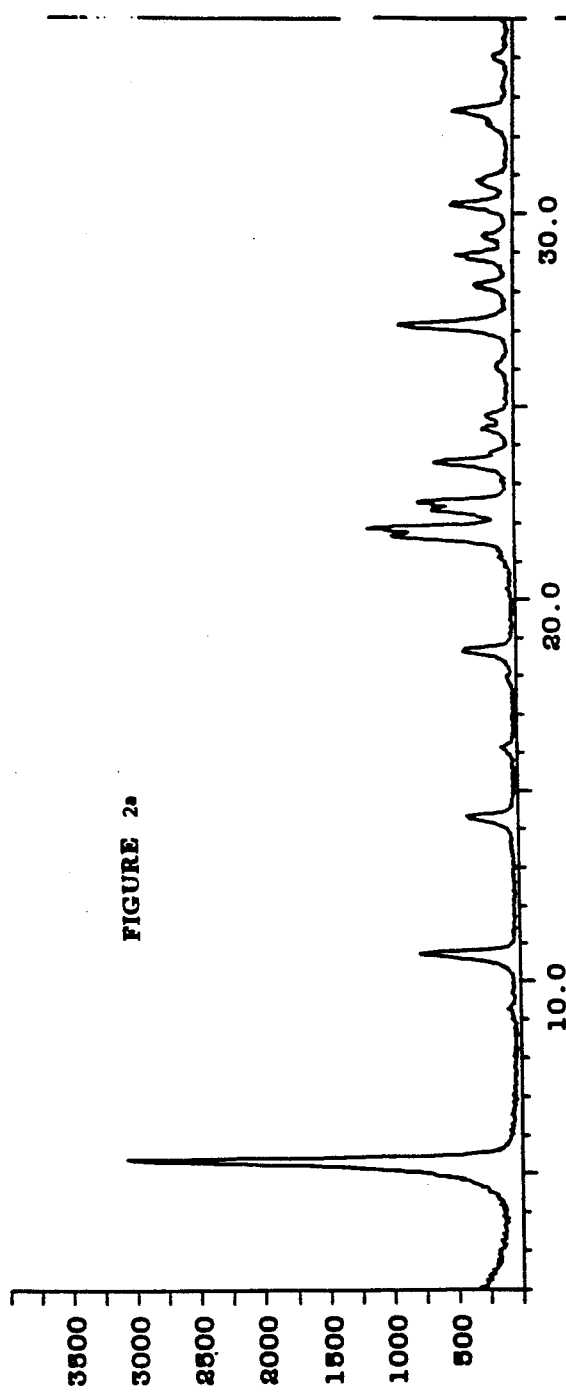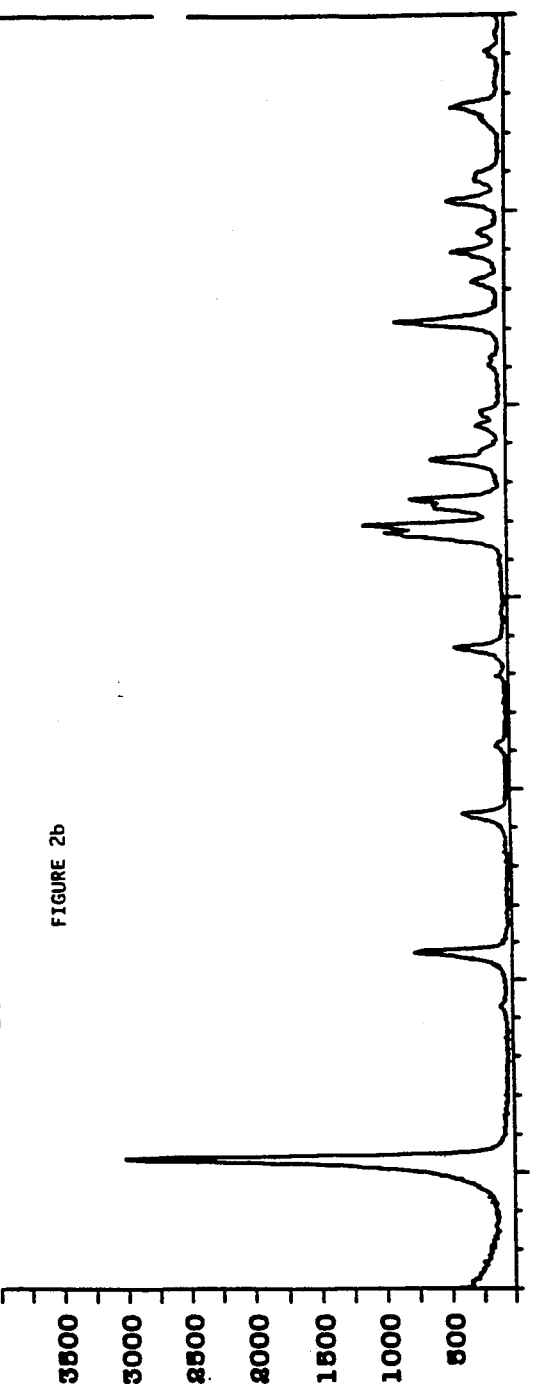

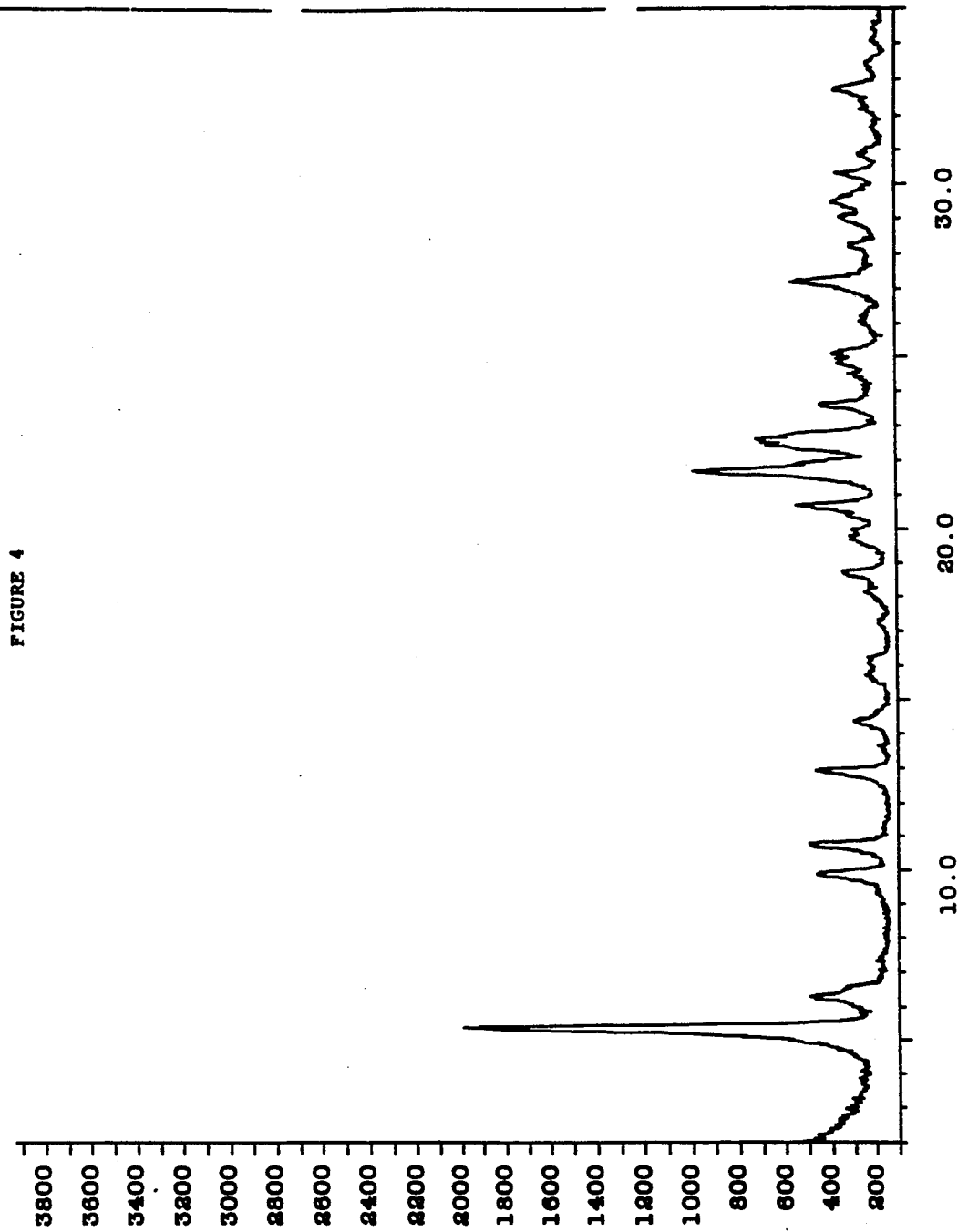

METHOD FOR CALCINING CRYSTALLINE (METALLO)ALUMINOPHOSPHATE COMPOSITIONS

BACKGROUND OF THE INVENTION

1. Field of the Invention

This invention relates to a new and useful improvement in preparing a crystalline [metallo]aluminophosphate composition. The improvement resides in a calcination method which avoids or minimizes structural changes during calcination by drying the composition, followed by heating the composition to a calcination temperature at a rate no greater than 10° C./minute with a high flow rate of a non-oxidizing gas, e.g. nitrogen, and thereafter with an oxygen-containing gas, e.g. air, at high gas flow rates, e.g., 100 to 400 cc/minute per gram.

This invention is particularly suited to treating as-synthesized crystalline [metallo]aluminophosphate composition comprising crystals having large pore windows measuring greater than about 10 Angstroms in diameter, such as, for example, greater than about 12 Angstroms in diameter. The resulting product is particularly suited to use in hydrocarbon conversion processes.

2. Discussion of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as rigid three-dimensional frameworks of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-38 (U.S. Pat. No. 4,046,859), and zeolite ZSM-23 (U.S. Pat. No. 4,076,842) merely to name a few.

Aluminum phosphates (which are included in the term [metallo]aluminophosphates by virtue of the bracketing of "metallo" which indicates its presence as optional) are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity. U.S. Pat. No. 4,673,559 teaches numerous different silicoaluminophosphate structures. Examples 17 and 18 of that patent show synthesis of MCM-9, a silicoaluminophosphate composition containing crystals having large pore windows measuring between 12 and 13 Angstroms in diameter.

U.S. Pat. No. 4,880,611 teaches compositions which comprise crystals having large pore windows of at least about 10 Angstroms, e.g. from about 12 to about 13 Angstroms, diameter. An example of such a composition is a large pore crystalline [metallo]aluminophosphate which has a framework topology after heating at 110° C. or higher giving and X-ray diffraction pattern with interplanar d-spacings at 16.4±0.2 Angstroms, 8.2±0.1 Angstroms, 6.21±0.05 Angstroms, 6.17±0.05 Angstroms, 5.48±0.05 Angstroms and 4.74±0.05 Angstroms, and without a significant interplanar d-spacing at 13.6–13.3 Angstroms. This material and its method of preparation are further set out in the aforementioned U.S. Pat. No. 4,880,611 which is incorporated herein by reference. Such a composition can be prepared from a reaction mixture hydrogel containing sources of aluminum oxide, phosphorus oxide, water, and a directing agent DA, preferably tetrapropylammonium.

An early reference to a hydrated aluminum phosphate which is crystalline until heated at about 110° C., at which point it becomes amorphous, is the "$H_1$" phase or hydrate of aluminum phosphate of F. d'Yvoire, *Memoir Presented to the Chemical Society*, No. 392, "Study of Aluminum Phosphate and Trivalent Iron", Jul. 6, 1961 (received), pp. 1762–1776. This material, when crystalline, is identified by the Joint Commission for Powder Diffraction Standards (JCPDS), card number 15-274, and has an X-ray diffraction pattern exhibiting lines of Tables I and II, hereinafter presented. Once heated at about 110° C., however, the d'Yvoire material becomes amorphous. The 18-membered ring aluminophosphate VPI-5 was published by M. Davis et al. at the "Innovation in Zeolite Materials Science" meeting in Sep., 1987. A further description of this material and its metal substituted aluminumphosphate counterparts can be found in published PCT application WO 89/ 01912, International Application Number PCT/US 88/02910 to Davis et al, filed Aug. 24, 1988 and published Mar. 9, 1989. U.S. Pat. No. 4,673,559 discloses the 18-membered ring silicoaluminophosphate MCM-9.

Silicoaluminophosphates of various structures are taught in U.S. Pat. No. 4,440,871. Aluminosilicates containing phosphorous, i.e. silicoaluminophosphates of particular structures are taught in U.S. Pat. Nos. 3,355,246 (i.e. ZK-21) and 3,791,964 (i.e. ZK-22). Other teachings of silicoaluminophosphates and their synthesis include U.S. Pat. No. 4,673,559 (two-phase synthesis method); 4,623,527 (MCM-10); 4,639,358 (MCM-1); 4,647,442 (MCM-2); 4,664,897 (MCM-4); 4,639,357 (MCM-5) and 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417 and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

U.S. Pat. No. 2,876,266 describes an active silicophosphoric acid or salt phase of an amorphous material prepared by absorption of phosphoric acid by premolded silicates or aluminosilicates.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550 and 3,697,550.

The [metallo]aluminophosphates are generally prepared from a reaction mixture which contains an organic directing agent which requires removal in order to provide a composition suited for catalysis. Commonly, such removal is effected by calcining. However, some [metallo]aluminophosphates are susceptible to structure alteration upon calcination by standard techniques. Accordingly, a calcination technique which does not cause substantial structural alteration would be particularly desirable for preparing [metallo]aluminophosphates for use in hydrocarbon conversion processes.

SUMMARY OF THE INVENTION

An improved method for preparing crystalline [metallo]aluminophosphate is provided. The method comprises a) contacting a dried as-synthesized crystalline [metallo]aluminophosphate in a calcination zone with a non-oxidizing gas while heating said [metallo]aluminophosphate to a suitable calcining temperature, preferably one ranging from 100° to 600° C., preferably 350° to 540° C. at a rate no greater than 10° C./minute, preferably at a rate no greater than 2° C./minute, and maintaining said contact at said calcining temperature for a period of from 1 to 48 hours, preferably 6 to 12 hours; b) introducing an oxygen-containing gas to said calcination zone in addition to said non-oxidizing gas and maintaining contact with said [metallo]aluminophosphate for a period of from 0.5 to 10 hours, preferably 1 to 4 hours; c) contacting said [metallo]aluminophosphate in said calcination zone with an oxygen-containing gas for a period of from 1 to 10 hours, preferably 2 to 6 hours; and d) contacting said [metallo]aluminophosphate with a cooling non-oxidizing gas for a period of time sufficient to reduce the temperature of said [metallo]aluminophosphate to a temperature of 20° to 30° C.; wherein the total flow rate of said non-oxidizing and oxygen-containing gases in steps a) through d) ranges from 100 to 500, preferably 200 to 400 cc/minute per gram of [metallo]aluminophosphate.

In a particularly preferred embodiment, the [metallo]aluminophosphate is dried under a vacuum of 0.05 to 10 torr, preferably 0.05 to 1 torr, prior to step a), for a period of time sufficient to remove water therefrom, e.g., 1 to 48 hours, preferably 6 to 24 hours. Such drying occurs at temperatures sufficient to remove water without altering the crystalline structure of the material. Moderate temperatures, e.g. 20° to 30° C are suitable, with room temperature preferable.

In another embodiment, the [metallo]aluminophosphate in step a) is held at a temperature of 25° to 150° C., preferably 30° to 80° C., for a period of 1 to 48 hours, preferably 6 to 24 hours, prior to exposure to the calcining temperature.

The non-oxidizing gas employed in the present calcination procedure can be any gas which lacks oxidizing capability. In particular, inert gases such as helium or nitrogen can be employed. Nitrogen is particularly preferred in view of its relatively low cost. The oxygen-containing gas utilized in the present method can be any suitable gas e.g., pure oxygen, or mixtures of inert gases with oxygen, e.g., air. Air is especially preferred from a cost standpoint as well as its limited oxidizing capacity resulting from the lower concentration of oxygen present, which moderates the oxidation occurring during the calcination procedure.

After calcination, the hydrocarbon sorption capacity of the hydrocarbon sorption-enhanced product can be measured, e.g. by thermogravimetric analysis. Comparisons of the respective sorption capacities of starting material and product typically show little loss of sorption capacity resulting from the calcination method of the present invention. Indeed, in some cases an enhancement of hydrocarbon sorptions, e.g., cyclohexane sorption results.

Sorption capacities may be determined as follows:

A weighed sample of the calcined adsorbant is contacted with a flowing stream of the equilibrium vapor of the adsorbate at 25° C., admixed with dry nitrogen. Adsorbates are water vapor and benzene, n-hexane, 2-methylpentane, xylene or cyclohexane vapors. The sample temperature is maintained at 25° to 90° C. for adsorbates other than ortho-xylene which temperature can be 120° C. and water for which it is 60° C. The increase in weight is measured gravimetrically and converted to the adsorption capacity of the sample in weight percent of calcined adsorbant.

It is to be generally understood that the method of the present invention may be used to treat any porous crystalline [metallo]aluminophosphate composition, particularly those which contain occluded organic directing agent such as as-synthesized compositions. The following [metallo]aluminophosphate materials are examples of materials suited to treatment by the present invention.

MCM-1 is a composition containing framework Al, P, and Si atoms which is further described in U.S. Pat. No. 4,639,358 which is incorporated herein by reference.

MCM-2 is a composition containing framework Al, P, and Si atoms which is further described in U.S. Pat. No. 4,673,559 which is incorporated herein by reference.

MCM-3 is a composition containing framework Al, P, and Si atoms which is further described in U.S. Pat. No. 4,632,811 which is incorporated herein by reference.

MCM-4 is a composition containing framework Al, P, and Si atoms which is further described in U.S. Pat. No. 4,664,897 which is incorporated herein by reference.

MCM-5 is a composition containing framework Al, P, and Si atoms which is further described in U.S. Pat. No. 4,639,357 which is incorporated herein by reference.

MCM-6 is a composition containing framework Al, P, and Si atoms which is further described in U.S. Pat. No. 4,673,559 which is incorporated herein by reference.

MCM-7 is a composition containing framework Al, P, and Si atoms which is further described in U.S. Pat. No. 4,673,559.

MCM-8 is a composition containing framework Al, P, and Si atoms which is further described in U.S. Pat. No. 4,673,559.

MCM-9 is a composition containing framework Al, P, and Si atoms which is further described in U.S. Pat. No. 4,673,559.

MCM-10 is a composition containing framework Al, P, and Si atoms which is further described in U.S. Pat. No. 4,623,527 which is incorporated herein by reference.

MCM-14 is a composition containing framework Al, P, and Sb atoms which is further described in U.S. Pat. No. 4,619,818 which is incorporated herein by reference.

Other suitable materials include those disclosed in U.S. Pat. No. 4,310,440 to Wilson et al, which is incorporated herein by reference. These include $AlPO_4$-5,-8,-9,-11,-12,-14,-16,-17,-18,-20,-21,-22,-23,-25, -26, -28 and -31.

A material which is particularly suited to treatment by the present invention is a composition which comprises crystals having large pore windows of at least about 10 Angstroms, e.g. from about 12 to about 13 Angstroms, diameter. An example of such a composition is a large pore crystalline [metallo]aluminophosphate which has a framework topology after heating at 110° C. or higher giving and X-ray diffraction pattern with interplanar d-spacings at 16.4±0.2 Angstroms, 8.2±0.1 Angstroms, 6.21±0.05 Angstroms, 6.17±0.05 Angstroms, 5.48±0.05 Angstroms and 4.74±0.05 Angstroms, and without a significant interplanar d-spacing at 13.6-13.3 Angstroms. This material and its method of preparation are further set out in U.S. Pat. No. 4,880,611 as noted above, which is incorporated herein by reference. Such a composition can be prepared from a reaction mixture hydrogel containing sources of aluminum oxide, phosphorus oxide, water, and a directing agent DA, preferably tetrapropylammonium.

Especially preferred for treatment by the calcination method of the present invention are [metallo]aluminophosphates having pores formed by 18-membered rings. Examples of such materials are VPI-5 and MCM-9 which are discussed above. Such materials are known to be hydrothermally sensitive and subject to structural alterations upon calcination by conventional techniques.

The solid product composition comprising the desired [metallo]aluminophosphate prior to treatment by the method of the present invention is preferably recovered from the reaction medium, as by cooling the whole to room temperature, water washing and filtering.

BRIEF DESCRIPTION OF THE DRAWINGS

FIG. 1a-b shows the X-ray diffraction patterns of the as-synthesized and calcined aluminophosphate products of Example 1. The calcined product was dried under vacuum and calcined with slow, ramped heating and high $N_2$/air flow.

FIG. 2a-b shows the X-ray diffraction patterns of the as-synthesized and calcined aluminophosphate products of Example 2. The calcined product was dried under vacuum and calcined with slow, ramped heating and high $N_2$/air flow.

FIG. 4 shows the X-ray diffraction pattern of the calcined aluminophosphate product of Example 5.

EMBODIMENTS

Figure 3A:
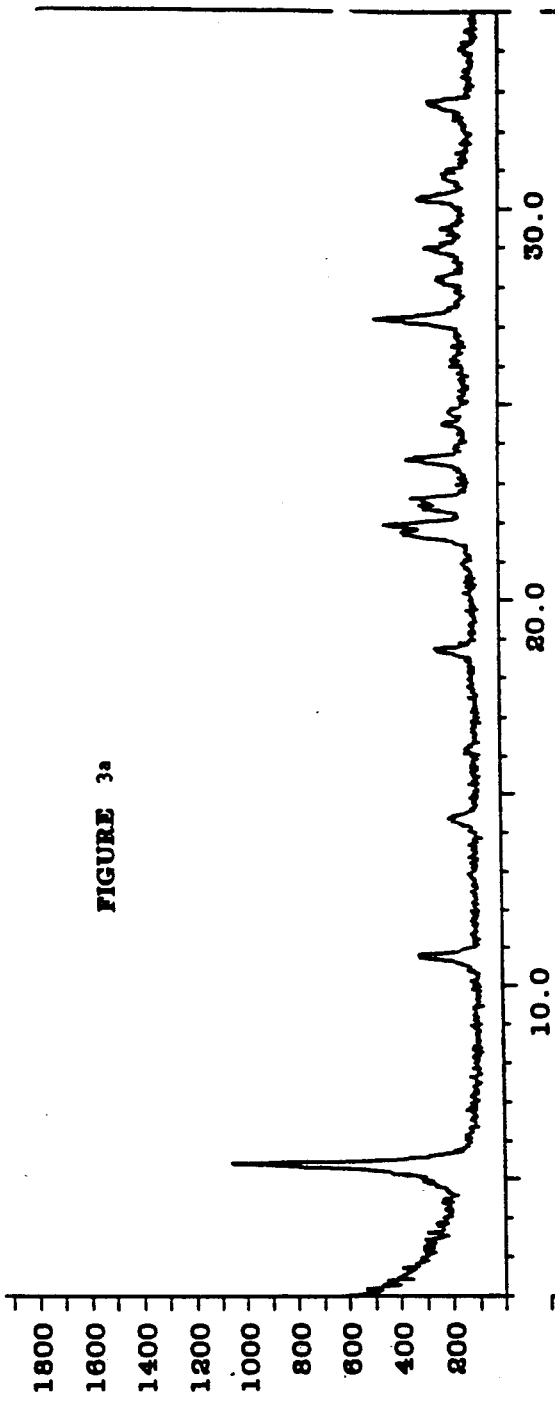
FIG. 3a-b shows the X-ray diffraction patterns of the as-synthesized and calcined silicoaluminophosphate products of Example 3. The calcined product was dried under vacuum and calcined with slow, ramped heating and high $N_2$/air flow.

Synthesis of crystalline [metallo]aluminophosphates typically involves phosphoric acid and hydrated alumina. The crystalline [metallo]aluminophosphate composition synthesized in accordance with the present method exhibits utility as a catalyst component for certain chemical reactions of interest, including cracking, hydrocracking, disproportionation, alkylation, isomerization, oxidation, and conversion of oxygenates, e.g. methanol, to hydrocarbons, e.g. gasoline-range hydrocarbons.

While the improved crystalline composition of the present invention may be used as a catalyst component in a wide variety of organic compound, e.g. hydrocarbon compound, conversion reactions, it is notably useful in the processes of cracking, hydrocracking, isomerization and reforming. Other conversion processes for which the present composition may be utilized as a catalyst component include, for example, dewaxing.

The crystalline [metallo]aluminophosphate composition prepared in accordance herewith can be converted to the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to the crystalline composition such as, for example, by, in the case of platinum, treating the material with a platinum metal-containing ion. Suitable platinum compounds for this purpose include chloroplatinic acid, platinous chloride and various compounds containing the platinum amine complex. Combinations of metals and methods for their introduction can also be used.

[Metallo]aluminophosphate prepared in accordance herewith can have original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earths and metals from Groups IIA, IIIA, IVA, VIIA, VIIIA, IB, IIB, IIIB and IVB of the Periodic Table of Elements (Sargent-Welch Scientific Company, 1979), especially Mn, Ca, Mg, Zn, Cd, Pd, Ni, Cu, Ti, Al, Sn, Fe and Co.

Typical ion exchange technique would be to contact the synthetic material with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the [metallo]aluminophosphate composition is then preferably washed with water and dried at a temperature ranging from 65° C. to about 315° C. and thereafter may be calcined in accordance with the present invention for periods of time ranging from 1 to 48 hours or more to produce a catalytically-active thermal decomposition product thereof.

The crystalline material prepared by the instant invention may be formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst comprising the present material is molded, such as by extrusion, the material can be extruded before drying or dried or partially dried and then extruded.

In the case of many catalysts, it may be desired to incorporate the hereby prepared [metallo]aluminophosphate with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina. The latter may be either naturally occurring or in the form of gelatinous precipitates, sols or gels including mixtures of silica and metal oxides. Use of a material in conjunction with the present [metallo]aluminophosphate, i.e. combined therewith, which is active, may enhance the conversion and/or selectivity of the catalyst in certain organic conversion processes. Inactive materials suitably serve as diluents to control the amount of conversion in a given process so that products can be obtained economically and without employing other means for controlling the rate or reaction. Frequently, crystalline catalytic materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized [metallo]aluminophosphate include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the crystals hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline material content ranging from about 1 to about 90 percent by weight, and more usually in the range of about 2 to about 50 percent by weight of the composite.

Employing a catalyst comprising the composition of this invention containing a hydrogenation component, reforming stocks can be reformed employing a temperature between 450° C. and 550° C. The pressure can be between 50 and 500 psig, but is preferably between 100 and 300 psig. The liquid hourly space velocity is generally between 0.1 and 10 hu$^{-1}$, preferably between 1 and 4 hr$^{-1}$ and the hydrogen to hydrocarbon mole ratio is generally between 1 and 10, preferably between 3 and 5.

A catalyst comprising the present composition can also be used for hydroisomerization of normal paraffins, when provided with a hydrogenation component, e.g. platinum. Hydroisomerization is carried out at a temperature between 250° C. to 450° C., preferably 300° C. to 425° C., with a liquid hourly space velocity between 0.1 and 10 hr$^{-1}$, preferably between 0.5 and 4 hr$^{-1}$, employing hydrogen such that the hydrogen to hydrocarbon mole ratio is between 1 and 10. Additionally, the catalyst can be used for olefin or aromatics isomerization employing temperatures between 0° C. and 550° C.

A catalyst comprising the [metallo]aluminophosphate of this invention can also be used for reducing the pour point of gas oils. This process is carried out at a liquid hourly space velocity between about 0.1 and about 5 hr$^{-1}$ and a temperature between about 300° C. and about 425° C.

Other reactions which can be accomplished employing a catalyst comprising the composition of this invention containing a metal, e.g. platinum, include hydrogenation-dehydrogenation reactions and desulfurization reactions, olefin polymerization (oligomerization), and other organic compound conversions such as the conversion of alcohols (e.g. methanol) to hydrocarbons.

In order to more fully illustrate the nature of the invention and the manner of practicing the same, the following examples are presented. In the examples, sorption capacity was measured at 30° C. on a DuPont 951 TGA (thermogravimetric analyzer) with cyclohexane as the sorbate. Adsorption volumes were computed from these data assuming normal liquid density for the sorbate.

EXAMPLE 1

A solution containing 22.5 g of orthophosphoric acid ($H_3PO_4$, 85 wt %) in 25 g $H_2O$ was added to a mixture containing 13.75g of pseudoboehmite alumina (Catapal B) in 37.5g of H₂O. The resulting mixture was predigested at room temperature under static conditions for 2 hours. Tetrabutylammonium hydroxide (55 wt %, 46.5 g) was added to the gel and then stirred for an additional 2 hours. The gel was crystallized under static conditions in a 150 cc bomb at 150° C. under autogenous pressure for 20 hours. At the end of the heating period, the bomb was quenched in cold water. The product was washed by decanting the supernatant liquid and then dried at room temperature.

EXAMPLE 2

26.8g (0.0189 mol) of pseudoboehmite (72% ash) slurried in 72 g of distilled water were added to a solution containing 42.87 g (0.38 mol) of H$_3$PO$_4$ (85.7 wt %) in 40 g of distilled water. The resulting mixture was stirred at room temperature for 2 hours. Subsequently, a slurry of triisopropanolamine (TIPOA, 95%) 36.2 g (0.19 mol) and tetramethylammonium hydroxide (TMAOH, 50%) 0.567 g (0.003 mol) in 5 g of water was added to the AlPO$_4$ gel and stirring was continued for an additional 2 hours. Resulting from this process was a homogeneous thick gel. The gel was then crystallized hydrothermally under static conditions in a 500 cc autoclave which was brought to temperature (142° C.) in 0.5 hour and held for 3.5 hours. At the conclusion of the heating period the reaction was quenched by placing the autoclave in ice water. The autoclave was then opened and the products were immediately removed to a 1000 ml beaker and slurried in 300 ml of distilled water. After allowing the solids to settle for 5 minutes, the liquid layer was decanted off. This process was continued 7 times more until the water layer was virtually clear. At this point the product was filtered and washed two times with distilled water. Subsequent product purification was carried out by acetone washes and distilled water Soxhlet extraction.

EXAMPLE 3

A solution containing 49.52 g aluminum trisecbutoxide (97%), 6.44 g of tetrabutylsilicate and 3.18 g cyclohexylamine was stirred at room temperature for five minutes. A solution of 22.5 g H$_3$PO$_4$ in 45.2 g of H$_2$O was added to the above mixture dropwise and predigested at room temperature with stirring for 2 hours. The gel was crystallized in a 300cc bomb at 130° C. with stirring under autogenous pressure for 19 hours. At the end of the heating period, the bomb was cooled to room temperature. The product was washed by decanting the supernatant liquid and then dried at room temperature.

EXAMPLE 4

Figure 3B:
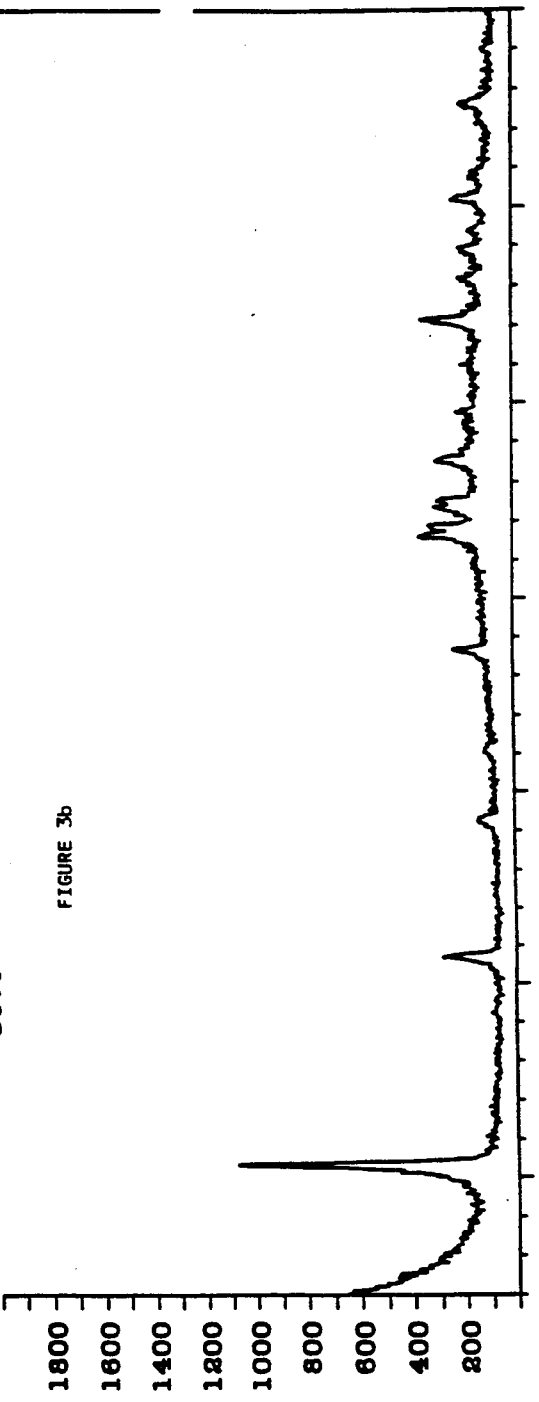

1 gram portions of the products of Examples 1 to 3 were calcined in a tube furnace by the following procedure:
- held under vacuum (0.05 torr of Hg) at room temperature for overnight
- exposure to 400 cc/minute N$_2$ flow, 1° C./minute to 50° C., held for 4 hours
- exposure to 400 cc/minute N$_2$ flow, 1° C./minute to 538° C., held for 8 hours
- exposure to 200 cc/minute air and 200 cc/minute N$_2$ at 538° C. for 2 hours
- exposure to 400 cc/minute air flow for 4 hours
- exposure to 400 cc/minute N$_2$ cool down to room temperature. FIGS. 1 to 3 show the X-ray diffraction patterns of the a) as-synthesized and b) calcined material. The structures of VPI-5 remain intact. The cyclohexane sorption capacities also remain unchanged after calcination as shown in the table below.

TABLE

| | | | Cyclohexane Sorption 30° C., P/P$_o$ = 0.6 | |
|---|---|---|---|---|
| Example | Al Source | organic | as-synthesized (g/100 g) | calcined (g/100 g) |
| 1 | Catapal B | tetrapropylammonium hydroxide | 10.1 | 10.6 |
| 2 | Catapal B | triisopropanolamine | 11.3 | 12.4 |
| 3 | Aluminum trisecbutoxide | cyclohexylamine | 13.5 | 13.1 |

EXAMPLE 5 (Comparative)

A 1 gram sample of the product of Example 1 was calcined in a tube furnace with temperature programming of 1° C./minute to 538° C. under 100 cc/minute of N$_2$ for two hours and then under 100 cc/minute of air for another two hours. Structure transformation was observed. FIG. 4 shows the X-ray diffraction pattern of the calcined product.

EXAMPLE 6 (Comparative)

Figure 5:
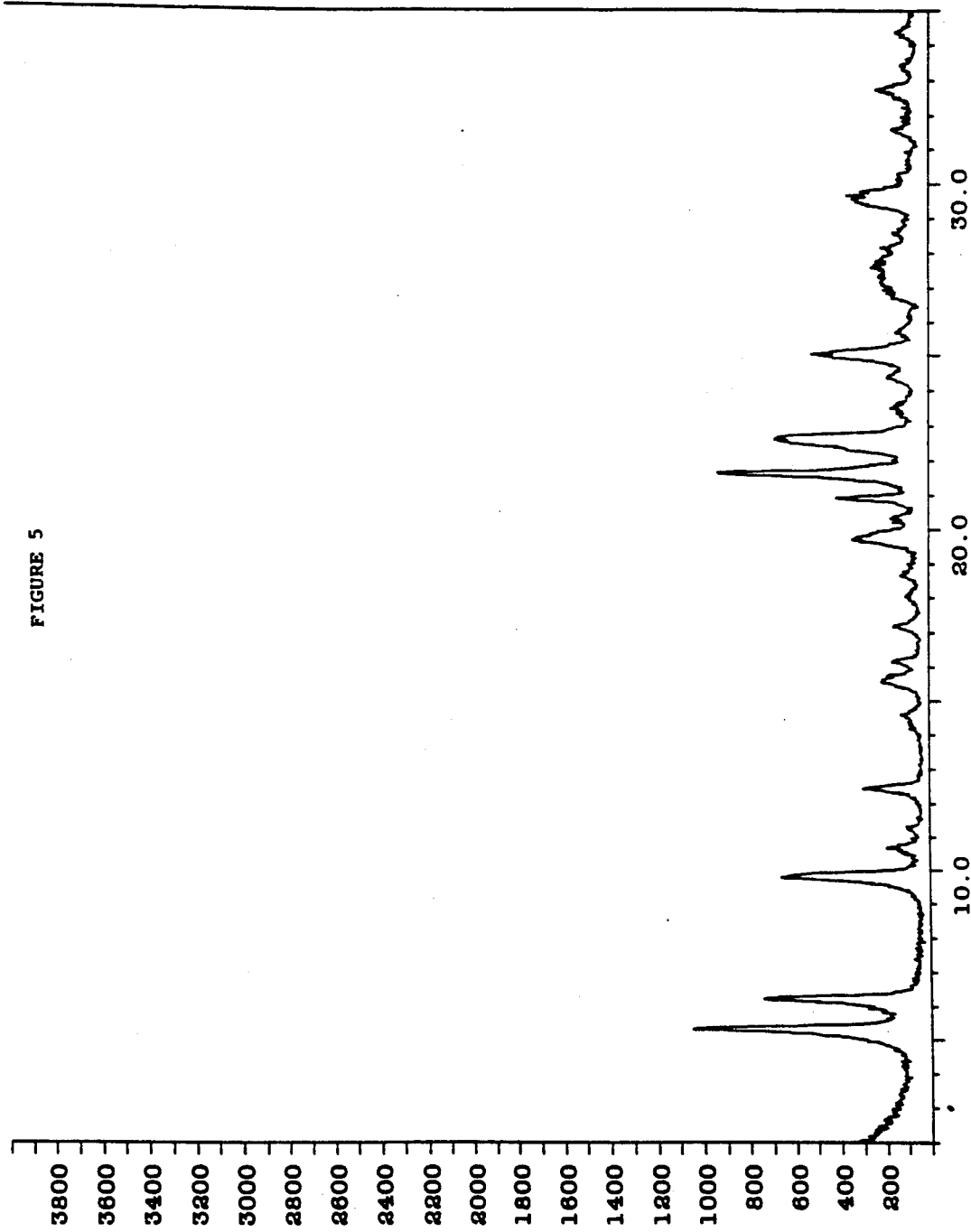
FIG. 5 shows the X-ray diffraction pattern of the calcined calcined aluminophosphate product of Example 6.

A 1 gram sample of the product of Example 1 was evacuated at room temperature to 10$^{-2}$ torr for 1 hour followed by raising the temperature 1° C./minute to 70° C. for 30 minutes, and finally increasing the temperature 1° C./minute to 110° C. for 10 hours. Structure transformation was observed. FIG. 5 shows the X-ray diffraction pattern of the sample.

What is claimed is:

1. A method for calcining a dried crystalline aluminophosphate having pore windows of at least about 10 Angstroms, which comprises a) contacting said aluminophosphate in a calcination zone with a non-oxidizing gas while heating said aluminophosphate to calcining temperature at a heating rate no greater than 10° C./minute and maintaining said contact at said calcining temperature for a period of from 1 to 48 hours; b) introducing an oxygen-containing gas to said calcination zone in addition to said non-oxidizing gas and maintaining contact with said aluminophosphate for a period of from 0.5 to 10 hours; c) contacting said aluminophosphate in said calcination zone with an oxygen containing gas for a period of from 1 to 10 hours; and d) contacting said aluminophosphate with a cooling non-oxidizing gas for a period of time sufficient to reduce the temperature of said aluminophosphate to a temperature of 20° to 30° C.; wherein the total flow rate of said non-oxidizing and oxygen-containing gases in steps a) through d) ranges from 100 to 500 cc/minute per gram of aluminophosphate, wherein said aluminophosphate is dried by treatment under a vacuum of 0.05 to 10 torr prior to step a).

2. The method of claim 1 wherein said aluminophosphate in step a) is held at a temperature of 25° to 200° C. for a period of 1 to 48 hours prior to exposure to said calcining temperature and said heating rate is no greater than 10° C./minute.

3. The method of claim 2 wherein said calcining temperature ranges from 350° to 600° C.

4. The method of claim 3 wherein said aluminophosphate has pores formed by 18-membered rings.

5. The method of claim 1 wherein said crystalline aluminophosphate is selected from the group consisting of VPI-5, MCM-9, and materials comprising crystals having a framework topology after heating at 110° C. or higher giving an X-ray diffraction pattern with interplanar d-spacings at 16.4±0.2 Angstroms, 8.2±0.1 Angstroms, 6.21±0.05 Angstroms, 6.17±0.05 Angstroms, 5.48±0.05 Angstroms and 4.74±0.05 Angstroms, and without a significant interplanar d-spacing at 13.6±13.3 Angstroms.

6. The method of claim 4 wherein said aluminophosphate is VPI-5.

7. The method of claim 4 wherein said aluminophosphate comprises crystals having a framework topology after heating at 110° C. or higher giving an X-ray diffraction pattern with interplanar d-spacings at 16.4±0.2 Angstroms, 8.2±0.1 Angstroms, 6.21±0.05 Angstroms, 6.17±0.05 Angstroms, 5.48±0.05 Angstroms and 4.74±0.05 Angstroms, and without a significant interplanar d-spacing at 13.6-13.3 Angstroms.

8. The method of claim 1 wherein said aluminophosphate initially contains an organic directing agent.

9. The method of claim 1 wherein said non-oxidizing gas is an inert gas.

10. The method of claim 9 wherein said inert gas is selected from the group consisting of nitrogen and helium.

11. The method of claim 10 wherein said inert gas is nitrogen.

12. The method of claim 1 wherein said oxygen-containing gas is air.

13. The method of claim 1 wherein said contact in step a) is maintained for a period of 1 to 48 hours; said contact in step b) is maintained for a period of 1 to 4 hours; and said contact in step c) is maintained for a period of 1 to 10 hours.

14. A method for calcining a crystalline aluminophosphate composition comprising pores which are formed by 18-membered rings which method comprises drying said composition by treatment under a vacuum of 0.05 to 10 torr, contacting the composition with an inert gas at a gas flow rate of 100 to 500 cc/minute per gram of said composition while heating said composition to calcining temperature at a heating rate no greater than 2° C./minute, and thereafter contacting said composition at calcining temperature with an oxygen-containing gas at a gas flow rate of 100 to 500 cc/minute per gram of said composition.

15. The method of claim 14 wherein said composition is an as-synthesized VPI-5 said inert gas is nitrogen, said oxygen-containing gas is air, said gas flow rates range from 200 to 500 cc/minute per gram of said composition and said calcining temperature ranges from 350° to 600 1°C.

16. The method of claim 14 wherein said composition comprises crystals having a framework topology after heating at 100° C. or higher giving an X-ray diffraction pattern with interplanar d-spacings at 16.4±0.2 Angstroms, 8.2±0.1 Angstroms, 6.21±0.05 Angstroms, 6.17±0.05 Angstroms, 5.48±0.05 Angstroms and 4.74±0.05 Angstroms, and without a significant interplanar d-spacing at 13.6-13.3 Angstroms, said inert gas is nitrogen, said oxygen-containing gas is air, said gas flow rates range from 200 to 500 cc/minute per gram of said composition and said calcining temperature ranges from 350° to 600° C.

* * * * *

UNITED STATES PATENT AND TRADEMARK OFFICE
CERTIFICATE OF CORRECTION

PATENT NO. : 5,174,976

DATED : December 29, 1992

INVENTOR(S) : Cynthia T-W. Chu et al.

It is certified that error appears in the above-identified patent and that said Letters Patent is hereby corrected as shown below:

Col. 11, line 11, "13.6 ± 13.3" should read --13.6 - 13.3--.
Col. 12, line 21, delete "1".
Col. 12, line 24, "100°C" should read --110°C--.

Signed and Sealed this

Twenty-sixth Day of October, 1993

Attest:

BRUCE LEHMAN

Attesting Officer    Commissioner of Patents and Trademarks